United States Patent Office 3,410,586
Patented Nov. 12, 1968

3,410,586
ABRASIVE WHEEL SUPPORT
Roland S. Gervais, 630 Anna Drive,
Anaheim, Calif. 92805
Filed Oct. 18, 1965, Ser. No. 496,848
3 Claims. (Cl. 287—53)

ABSTRACT OF THE DISCLOSURE

A bushing having internal threads on one end and an outwardly tapered conical surface on the opposite inner end of the bushing bore is bonded in the center of a grinding wheel. The bushing carrying the grinding wheel is threaded onto the end of a spindle having a tapered surface which mates with the tapered surface on the bushing to assure that the grinding wheel is always mounted with the same angular orientation relative to the spindle.

---

This invention relates to means for mounting abrasive wheels and the like, and, more particularly, to means for removably mounting such wheels on tapered rotary spindles having external threads at their free ends.

Abrasive wheels for grinding, polishing, buffing, shaping and performing other operations in a machine shop are normally removably mounted on the rotary spindle of a grinding machine so that when the wheel is worn down it may be removed from the spindle and replaced by another. Moreover, it is important that the wheels be removable in order that wheels of different sizes, shapes or abrasive materials can be interchangeably mounted on the spindle, since no one abrasive wheel can satisfactorily perform the varied operations required in machining parts to close tolerances.

Abrasive wheels are commonly mounted by inserting a bushing in an aperature through the center of the wheel and slipping the bushing on the spindle, using a separate nut threaded onto the distal end of the spindle to retain the wheel in place. In order to stabilize the wheel, the bushing often has a pair of annular retaining plates or washers extending outwardly at its opposite ends and abutting opposite sides of the wheel. In precision grinders stability is especially important, so the bushing bore and the spindle surface are sometimes conformably tapered toward the distal end of the spindle to assure a tight fit.

Bushings suitable for precise work have been quite expensive, so that many shops have only one for each grinding machine. Thus, each time a wheel is changed, one of the washers must be unthreaded so that the bushing may be removed from one wheel and reassembled on another. This not only results in a considerable amount of lost time in dismantling and reassembling the bushing, but causes a serious problem with respect to dressing or truing the wheel each time it is placed on the spindle.

For accurate work with abrasive wheels, it is essential that the wheel be concentric with the axis of rotation of the spindle so that the entire circumference of the wheel abrades uniformly on a work-piece. Therefore, when an abrasive wheel is mounted on the rotary spindle of a grinding machine for the first time, it must be dressed or trued to eliminate any eccentricity, usually by passing a diamond tip back and forth across the edge of the rotating wheel to wear away any eccentric portions. If the faces of the wheel are to be used for abrading, it is also necessary to true them with the diamond tip.

If the wheel is removed from the spindle, unless it is replaced at the same radial position relative to the spindle, it must be dressed each time it is remounted. Further, the axis of rotation of the driving spindle generally does not exactly correspond to the spindle's geometric central axis so that even if the bushing fits tightly around the spindle, if the wheel is not replaced each time at precisely the same rotative position relative to the spindle, it will not be concentric with the spindle's axis of rotation, and will have to be redressed.

Not only is such redressing time-consuming, it is also expensive in that a substantial portion of the wheel, and some of the diamond tip, is worn away each time the wheel is trued. The redressing problem is particularly acute with form-grinding wheels having a nonplanar geometric shape on their edge for shaping curved or irregular pieces. Since the diamond tip must be carefully moved back and forth across the edge precisely in accordance with the desired geometric shape, the labor involved in redressing the wheel often costs more than the wheel itself.

Eccentric mounting has been a particular problem with the prior art bushings described above because the rotative and radial position at which the grinding wheel is mounted relative to the spindle is purely random. Thus, there is a need for a simple inexpensive grinding wheel support which enables quick and easy mounting of the wheel on the tapered spindle, and assures that the wheel is returned to exactly the same rotative and radial position relative to the spindle each time it is remounted.

This invention accomplishes these results by providing a mounting adapter in the form of a bushing with stabilizing shoulders which are permanently affixed to the wheel, so as to permit no relative movement between the wheel and bushing. The bore of the bushing has a tapered portion and an internally threaded portion, adapted to conform to the taper and threads of a spindle, so that each time the adapter is threaded onto the spindle the tapered portion of the bushing bore abuts the tapered portion of the spindle after precisely the same degree of rotation. Thus, the wheel always returns to exactly the same position relative to the spindle.

In an exemplary embodiment, the adapter is composed of a plastic resin material which substantially reduces its cost and, further, is sufficiently resilient to cushion the wheel from shocks and reduce chatter.

These and other objects, advantages and features of the invention will be apparent from the following detailed description when read with reference to the accompanying drawings in which.

Figure 2:
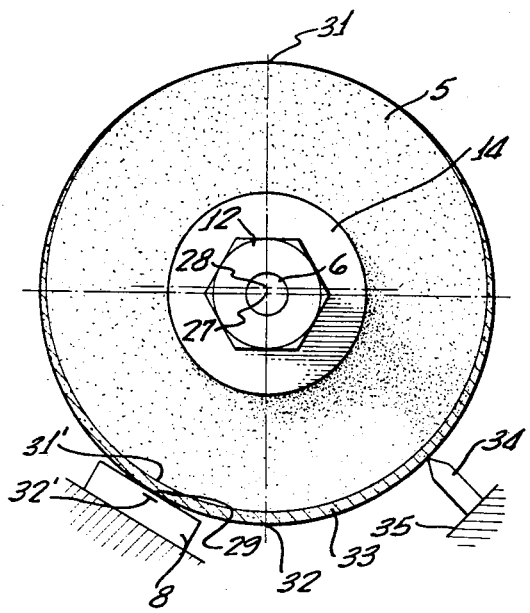
FIG. 2 is a front elevation view of the abrasive wheel and spindle illustrated in FIG. 1 with eccentric portions of the wheel shaded.
Figure 1:
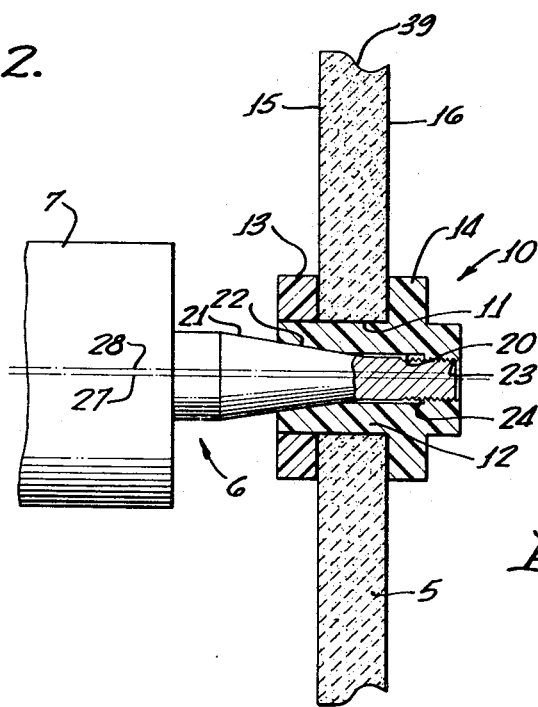
FIG. 1 is a section through an abrasive wheel mounted on a rotary spindle, illustrating a preferred embodiment of this invention.

Referring to FIGS. 1 and 2, an abrasive wheel 5, for example, composed of granules of abrasive material cemented together, is mounted on the spindle 6 of a grinding machine 7. The spindle is operably connected to a motor (not shown) which rotates the wheel at high speeds to grind, polish, shape, buff or otherwise abrade an exemplary work-piece 8.

An adapter 10, which extends through an aperture 11 in the center of the wheel and bears on the spindle, includes a bushing or sleeve 12 with a pair of annular shoulders 13, 14 extending radially outward from its opposite ends to abut the faces 15, 16 of the wheel. One shoulder 14 is an integral part of the bushing, while the other 13 is positioned and bonded to the bushing after the bushing is inserted through the wheel aperture.

Since the diameter of the aperture 11 may vary from wheel to wheel, the bushing 12 is preferably bonded in the aperture to provide a tight fit. In some instances, however, other means can be used to obtain the same results. To further assure that there is no relative rotation between the wheel and the bushing and to strengthen the overall configuration, the shoulders 13, 14 are also bonded to the wheel.

The spindle 6 of the grinding machine and the axial bore 20 of the bushing include complementary tapered frusto-conical surface portions 21, 22 which abut when the adapter is mounted on the spindle to provide a large bearing surface for stabilizing the wheel on the spindle—both longitudinally and axially. Internal threads 23 are formed at one end of the bore wall. They engage external threads 24 on the distal end of the spindle to operationally retain the adapter. The threads 23, 24 are left handed or right handed as required to permit the spindle 6 to tighten their engagement so that the wheel will tightly abut the spindle during use.

When a new wheel is first mounted on the spindle, its geometric center may or may not coincide with the longitudinal central axis 27 of the spindle. In any event, the axis of rotation 28 of the spindle is often slightly displaced from the central axis 27 of the spindle for various reasons such as uneven wear of the spindle bearings. This is exemplarily shown in FIG. 2 where the axis of rotation 28 is above the center of the spindle 27 while the wheel is concentric with the spindle. Thus, if the work-piece 8 is set to just contact point 29 on the circumference of the wheel, point 32 when rotated adjacent the work-piece will occupy the position shown as 32' and will abrade deeply into the piece, while point 31 will pass the work-piece at point 31' without contacting it at all.

For precision work, it is essential that the entire circumference of the wheel abrade the work-piece uniformly. Thus, the wheel must be dressed or trued by wearing off the eccentric portion 33 (the shaded area in FIG. 2) with a diamond pointed cutter 34. The cutter is mounted on a platform 35 which may be moved across the edge and radially toward the axis of rotation 28. After dressing, the geometric center of the wheel will have been shifted from the center 27 of the spindle and bushing bore to coincide with the axis of rotation 28 so that the wheel may be operated satisfactorily for precision grinding and polishing, at least until it is removed from and remounted on the spindle.

It will be noted that the edge 39 of the wheel illustrated in FIG. 1 is adapted for form-grinding of an irregular geometric shape. This is dressed in much the same manner as described with respect to FIG. 2, except that the dressing is much more difficult since the cutter must be moved in accordance with the desired pattern.

From time to time, it will be necessary to remove the wheel from the spindle while another wheel of a different size, shape, or abrasive material is used on the grinding machine. This may be done by simply unthreading the wheel and bushing 12 from the spindle 6 and storing the wheel and adapter assembly. When the wheel is remounted on the spindle, the taper of the abutting bushing and spindle assures a very tight fit so that the wheel will always return to the same radial position relative to the spindle. Further, since the location of the internal threads 33 of the adapter is fixed relative to the tapered portion 22 of the bore wall, the bore wall will always abut the spindle when the wheel has been threaded onto the spindle the same number of turns. As a result, the wheel will always be mounted at exactly the same rotative position relative to the spindle so that the wheel continues to be concentric with the axis of rotation and need not be redressed.

The adapter is preferably made of a plastic resin material such as Teflon or nylon which may be easily and securely bonded to the wheel and to other component parts, e.g. by an epoxy glue. The plastic selected is sufficiently resilient to absorb some of the shocks imparted to the wheel, which reduces the likelihood that the spindle will become misaligned from the axis of rotation. An additional advantage of the plastic is that it does not scar the tapered portion of the metal spindle.

Figure 3:
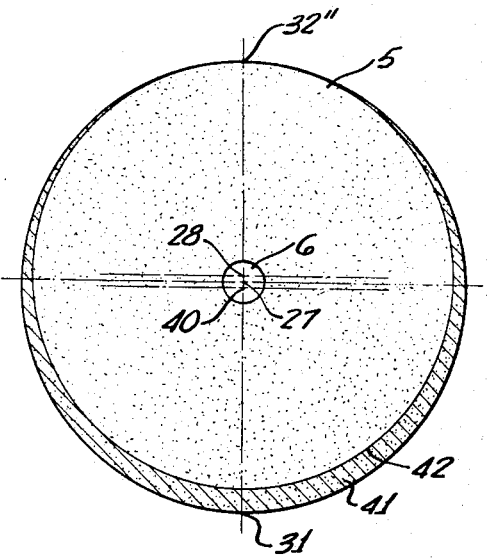
FIG. 3 is a view similar to that of FIG. 2 showing the abrasive wheel remounted on the spindle at a different relative rotative position.

FIG. 3 illustrates why a wheel must often be redressed each time it is remounted due to the fact that prior art devices do not return a wheel to the same rotative position relative to the spindle. The wheel 5, which has been previously trued and removed as described above, is shown remounted on the spindle 180° displaced from the position in which it was earlier mounted and trued. Note that the spindle 6 in FIGS. 2 and 3 is in the same position, but that the wheel is arcuately displaced so that point 31 which was previously on top of the wheel is now at the bottom of the wheel.

During the original dressing operation, the geometric center of the wheel was shifted from the center of the bore 27 to coincide with the axis of rotation 28. Now with the wheel rotated 180° relative to the spindle, the center of the wheel is at 40 below the center 27 of the bore and spindle while the axis of rotation 28 of the spindle is still above the central axis 27. Thus, the point 31 is farther from the axis of rotation of the spindle than is the point 32''. Hence, it is necessary to redress the wheel to remove the "new" eccentric portion 41 so that the edge of the wheel takes on the configuration shown by line 42.

While the extreme example of remounting the wheel displaced 180° relative to the spindle has been used for purposes of illustration, the same problem exists to a lesser extent at other angular displacements.

Sometimes the faces 15, 16 of the grinding wheel are used for grinding or polishing. If the axis of rotation of the spindle is not parallel to the central axis of the spindle, as is often the case at least after a grinding machine has been subjected to substantial use, the faces of the wheel will not be perpendicular to the axis of rotation. Under these circumstances, not only the edge, but also the face, must be dressed. If the wheel is then removed and remounted at a different rotative position relative to the spindle, the faces again will not be perpendicular to the axis of rotation because of the angularity between the central axis of the spindle and the axis of rotation, and it will be necessary to redress them.

In actual practice, an 8-inch wheel mounted with a commonly used prior art adapter often had to be redressed to remove 0.005 to 0.02 inch from its radius; whereas, the same size wheel mounted with the novel adapter described herein was trued once, then removed and replaced repeatedly without the distance from the center of rotation to any point on the wheel varying more than 0.00002 inch.

It is to be understood that this invention is not limited to any particular type of abrasive wheel or abrading operation. For example, it is applicable not only to the more common abrasive wheels but to diamond wheels as well. It is equally applicable to inside and outside diameter grinding, centerless grinding, thread grinding, form grinding, surface grinding and other similar operations. Thus, the above-described exemplary embodiment is intended to be illustrative only, and the invention should not be limited except in accordance with the following claims.

I claim:

1. An adapter for removably mounting an abrasive wheel on a rotatable spindle having external threads formed on its free end and a portion which tapers outwardly away from the threads, comprising:
    (a) a sleeve affixed to a grinding wheel to prevent relative movement therebetween;
    (b) said sleeve having an interior wall defining an axial bore with an enlarged diameter portion on one end for receiving and abutting the tapered portion of the spindle when said wheel is in place on the spindle;
    (c) internal threads formed in the other end of said bore in longitudinally fixed relation to said enlarged diameter portion for engaging the threads on said spindle and a cylindrical intermediate portion extending between said internal threads and said enlarged diameter portion, said threads and said enlarged diameter bore portion cooperating to assure that the wheel is always mounted at the same position relative to the spindle;

(d) said wheel being centrally apertured and snugly receives said sleeve therein;

(e) said sleeve also including a shoulder adjacent to but spaced from said other end and extending radially outward from the sleeve periphery and which is affixed to one face of said wheel; and (f) the axial dimension of the cylindrical intermediate portion of said sleeve is related to the axial width of the wheel so that the enlarged diameter portion and internal threaded portion are spaced on opposite sides of the median plane of said wheel and said threads engage axially beyond one side of the wheel and said enlarged diameter bore wall abuts the tapered spindle portion axially beyond the other side of the wheel to longitudinally stabilize the wheel.

2. An adapter for removably mounting an abrasive wheel on a rotatable spindle having external threads formed on its free end and a portion which tapers outwardly away from the threads, comprising:

(a) a sleeve affixed to a grinding wheel to prevent relative movement therebetween;

(b) said sleeve having an interior wall defining an axial bore with an enlarged diameter portion on one end for receiving and abutting the tapered portion of the spindle when said wheel is in place on the spindle;

(c) internal threads formed in the other end of said bore in longitudinally fixed relation to said enlarged diameter portion for engaging the threads on said spindle, said enlarged diameter portion of the bore wall being tapered outwardly away from said internal threads and said threads and said enlarged diameter bore portion cooperating to assure that the wheel is always mounted at the same position relative to the spindle;

(d) said adapter is composed of a plastic resin material; and (e) said sleeve includes a pair of annular shoulders extending radially outward from the sleeve which are adhesively bonded to the opposite faces of the wheel, one of the shoulders being integral with said sleeve and the other shoulder being affixed to the sleeve.

3. On a grinding machine, the combination of:

(a) a power driven spindle rotatable at high speeds, said spindle having external threads at its free end and a frusto-conical tapered portion inward of the threads with its smaller diameter toward the free end of the spindle;

(b) a generally cylindrical abrasive wheel including opposed face surfaces, an abrading edge, and an interior surface defining a longitudinal circular aperture through its center;

(c) a generally cylindrical plastic bushing extending through said wheel aperture in snug relationship thereto;

(d) said bushing having an interior wall defining an axial bore therethrough with one end portion internally threaded to receive the spindle threads, and the other end portion tapered to conform to the spindle taper, said bushing being dimensioned so that the tapered portions abut when said threads are engaged; and, (e) a pair of annular shoulders extending radially outward from opposite ends of the bushing adhesively bonded to respective ones of the wheel faces, one of the shoulders being integral with the bushing and the other shoulder being adhesively bonded to the bushing.

References Cited
UNITED STATES PATENTS

| | | | |
|---|---|---|---|
| 726,378 | 4/1903 | Tucker | 287—52.07 XR |
| 2,283,348 | 5/1942 | Adams et al. | 287—53 |
| 2,675,653 | 4/1954 | Bryant | 51—168 |
| 3,264,016 | 8/1966 | Reisch | 287—53 |

CARL W. TOMLIN, *Primary Examiner.*

A. KUNDRAT, *Assistant Examiner.*